(12) United States Patent
Hu et al.

(10) Patent No.: US 8,872,973 B2
(45) Date of Patent: Oct. 28, 2014

(54) LIGHT GUIDING SYSETM, EDGE TYPE BACKLIGHT MODULE AND LIQUID DISPLAY DEVICE

(71) Applicant: Shenzhen China Star Optoelectronics Technology Co., Ltd., Guangdong (CN)

(72) Inventors: Che-chang Hu, Shenzhen (CN); Kuang-yao Chang, Shenzhen (CN); Chao Ning, Shenzhen (CN); Yong Fan, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 114 days.

(21) Appl. No.: 13/819,341

(22) PCT Filed: Jan. 28, 2013

(86) PCT No.: PCT/CN2013/071032
§ 371 (c)(1),
(2), (4) Date: Feb. 27, 2013

(87) PCT Pub. No.: WO2014/113993
PCT Pub. Date: Jul. 31, 2014

(65) Prior Publication Data
US 2014/0204313 A1    Jul. 24, 2014

(30) Foreign Application Priority Data

Jan. 22, 2013    (CN) .......................... 2013 1 0027243

(51) Int. Cl.
*G02F 1/1335*    (2006.01)
*A47F 3/00*    (2006.01)
*F21V 7/04*    (2006.01)
*F21V 8/00*    (2006.01)

(52) U.S. Cl.
CPC .................................. *G02B 6/0028* (2013.01)
USPC ............................................ 348/561; 349/64

(58) Field of Classification Search
USPC ...................................................... 349/64, 65
See application file for complete search history.

(56) References Cited

FOREIGN PATENT DOCUMENTS

CN    103017090 A    4/2013

*Primary Examiner* — Phu Vu
(74) *Attorney, Agent, or Firm* — Andrew C. Cheng

(57) ABSTRACT

A light guiding system, an edge type backlight module and a liquid crystal display are disclosed. The light guiding system includes an ambient light collection system facing toward ambient light to absorb the ambient light and to generate absorbed light, a plurality of light guiding devices, and at least a first and a second light guiding bar. Each of the light guiding devices includes a light emitting end and a light incident end. The light incident ends of the optical fibers are arranged close to the ambient light collection system, and the lights entered from the light incident ends are propagated toward the light emitting ends. Each of the light guiding bars includes a light emitting surface, a light incident surface connected to the light emitting surface, and a first lateral side opposite to the light incident surface.

18 Claims, 4 Drawing Sheets

LIGHT GUIDING SYSETM, EDGE TYPE BACKLIGHT MODULE AND LIQUID DISPLAY DEVICE

BACKGROUND OF THE INVENTION

1. Field of the Invention

Embodiments of the present disclosure relate to liquid crystal display technology, and more particularly to a light guiding system, an edge type backlight module and a liquid crystal device.

2. Discussion of the Related Art

LEDs or fluorescent lamps are usually adopted as backlight sources TFT-LCDs. Both of the light sources are driven by electrical power. As the power consumptions of the backlight source may be over eighty percents of the total amount of the power consumptions, it may be accumulated to a huge amount after a long period of time. Currently, oil-fired, coal-fired, or nuclear electricity are major power generation methods, which may result in environmental problems such as greenhouse effect, nuclear pollution, and so on.

Ambient lights, such as sun lights, are natural resources not harmful to environment. The ambient light includes visible lights needed by the backlight sources, and thus the ambient light may be collected and be propagated into backlight modules by light guiding devices. In this way, the ambient light may be utilized as backlight sources so as to reduce the power consumption.

FIG. 1 is a schematic show of a light guiding system of a typical edge type backlight module. The light guiding system 1 absorbs ambient light CL via an ambient light collection system 10 and generates absorbed light SL. The absorbed lights SL are guided into a plurality of optical fibers 20. Light emitting ends 21 of each of the optical fibers 20 are arranged close to a light incident surface 31 of a light guiding plate 30. The lights emitted from the light emitting ends 21 enter the light guiding plate 30 via the light incident surface 31. The lights are then mixed within the light guiding plate 30 and emit out via a light emitting surface 33. In this way, lights emitted from the light emitting ends 21 can be the backlight source of the backlight module 1.

The main problem of the above backlight module structure resides in that the emitting angle of the light emitting ends 21 of the optical fibers 20 is small than 60 degrees. When the light emitting ends 21 of the plurality of optical fibers 20 are close to the light incident surface 31 of the light guiding plate 30, the brightness difference shown on the light incident surface 31 may be obvious if a gap between two adjacent light emitting ends 21 is larger. The gap may be reduced by arranging more optical fibers 20. However, the cost and the manufacturing complexity are increased with such solution.

SUMMARY

In one aspect, a light guiding system for an edge-type backlight module includes: an ambient light collection system facing toward ambient light to absorb the ambient light and to generate absorbed light; a plurality of light guiding devices, each of the light guiding devices includes a light emitting end and a light incident end, the light incident ends of the optical fibers are arranged close to the ambient light collection system, and the lights entered from the light incident ends are propagated toward the light emitting ends; and at least a first and a second light guiding bars, each of the light guiding bars includes a light emitting surface, a light incident surface connected to the light emitting surface, and a first lateral side opposite to the light incident surface, the light emitting surface is close to a light incident surface of a light guiding plate, the first lateral surfaces of the first and the second light guiding bars face toward each other, the light guiding devices are divided into a first group and a second group, the light emitting ends of the first group are arranged close to the light incident surfaces of the first light guiding bar, and the light emitting ends of the second group are arranged close to the light incident surfaces of the second light guiding bar.

Wherein the number of the light guiding devices in the first group is the same with that of the second group.

Wherein the light guiding devices are optical fibers, and the light guiding bars are made by PMMA.

Wherein the light guiding bar further includes a second lateral side opposite to the light emitting surface, and a bottom and a top connected to the light emitting surface, and a reflective layer is arranged on the first lateral side, the second lateral side, the bottom, and the top.

Wherein a plurality of dots is arranged on the second lateral side, and the dots are substantially cylinder-shaped.

Wherein a plurality of dots is arranged on the second lateral side, and the dots are substantially hemisphere-shaped.

In another aspect, an edge type backlight module includes a back plate, a light guiding plate, an optical film, and a light guiding system. The light guiding plate includes a light incident surface, a bottom surface and a light emitting surface opposite to each other, the bottom surface and the light emitting surface connect to the light incident surface, the back plate is arranged below the bottom surface, and the optical film is arranged above the light emitting surface. The light guiding system includes: an ambient light collection system facing toward ambient light to absorb the ambient light and to generate absorbed light; a plurality of light guiding devices, each of the light guiding devices includes a light emitting end and a light incident end, the light incident ends of the optical fibers are arranged close to the ambient light collection system, and the lights entered from the light incident ends are propagated toward the light emitting ends; and at least a first and a second light guiding bars, each of the light guiding bars includes a light emitting surface, a light incident surface connected to the light emitting surface, and a first lateral side opposite to the light incident surface, the light emitting surface is close to a light incident surface of a light guiding plate, the first lateral surfaces of the first and the second light guiding bars face toward each other, the light guiding devices are divided into a first group and a second group, the light emitting ends of the first group are arranged close to the light incident surfaces of the first light guiding bar, and the light emitting ends of the second group are arranged close to the light incident surfaces of the second light guiding bar.

Wherein the number of the light guiding devices in the first group is the same with that of the second group.

Wherein the light guiding devices are optical fibers, and the light guiding bars are made by PMMA.

Wherein the light guiding bar further includes a second lateral side opposite to the light emitting surface, and a bottom and a top connected to the light emitting surface, and a reflective layer is arranged on the first lateral side, the second lateral side, the bottom, and the top.

Wherein a plurality of dots is arranged on the second lateral side, and the dots are substantially cylinder-shaped.

Wherein a plurality of dots is arranged on the second lateral side, and the dots are substantially hemisphere-shaped.

In another aspect, a liquid crystal display includes: a back plate, a light guiding plate, an optical film, a display panel, and a light guiding system. The light guiding plate includes a light incident surface, a bottom surface and a light emitting surface opposite to each other, the bottom surface and the light emitting surface connect to the light incident surface, the back plate is arranged below the bottom surface, and the optical film is arranged above the light emitting surface. The light guiding system includes: an ambient light collection system facing toward ambient light to absorb the ambient light and to generate absorbed light; a plurality of light guiding devices, each of the light guiding devices includes a light emitting end and a light incident end, the light incident ends of the optical fibers are arranged close to the ambient light collection system, and the lights entered from the light incident ends are propagated toward the light emitting ends; and at least a first and a second light guiding bars, each of the light guiding bars includes a light emitting surface, a light incident surface connected to the light emitting surface, and a first lateral side opposite to the light incident surface, the light emitting surface is close to a light incident surface of a light guiding plate, the first lateral surfaces of the first and the second light guiding bars face toward each other, the light guiding devices are divided into a first group and a second group, the light emitting ends of the first group are arranged close to the light incident surfaces of the first light guiding bar, and the light emitting ends of the second group are arranged close to the light incident surfaces of the second light guiding bar.

Wherein the number of the light guiding devices in the first group is the same with that of the second group.

Wherein the light guiding devices are optical fibers, and the light guiding bars are made by PMMA.

Wherein the light guiding bar further includes a second lateral side opposite to the light emitting surface, and a bottom and a top connected to the light emitting surface, and a reflective layer is arranged on the first lateral side, the second lateral side, the bottom, and the top.

Wherein a plurality of dots is arranged on the second lateral side, and the dots are substantially cylinder-shaped.

Wherein a plurality of dots is arranged on the second lateral side, and the dots are substantially hemisphere-shaped.

In view of the above, by adopting two light guiding bars, the plurality of optical fibers may be divided into two groups. With such configuration, not only the width and the length of the light guiding bar 40 are decreased, but also the dimension and the weight of the edge-type backlight module are decreased. At the same time, the optical path within the light guiding bar is shortened. By configuring the shape and the arrangement of the dots on the light guiding bar, the lights from the light emitting ends uniformly radiate to the light guiding plate such that the optical performance of the edge-type backlight module is enhanced.

DETAILED DESCRIPTION OF THE EMBODIMENTS

Embodiments of the invention will now be described more fully hereinafter with reference to the accompanying drawings, in which embodiments of the invention are shown.

Figure 1:
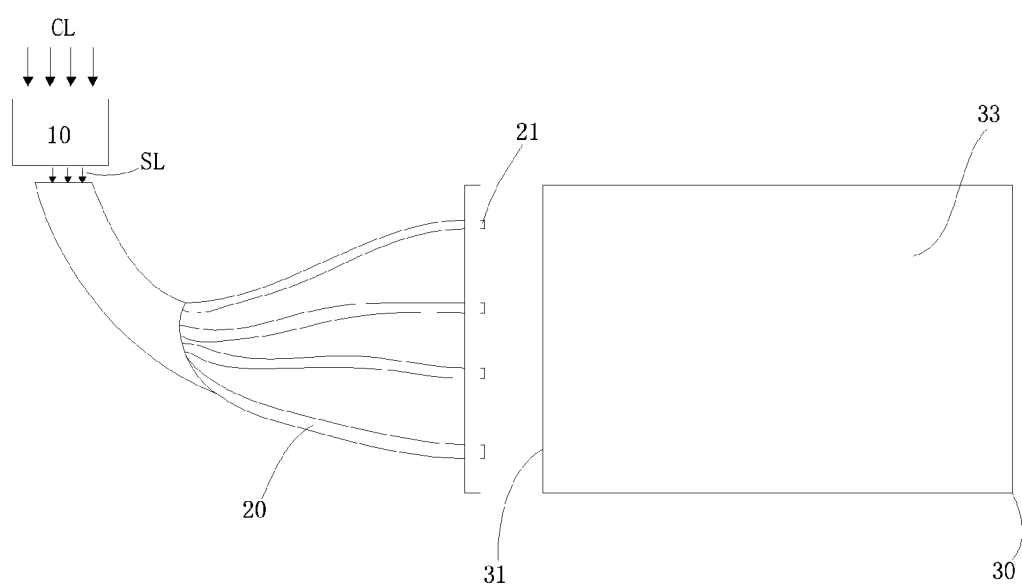
FIG. 1 is a schematic view of a light guiding system of a typical edge type backlight module.
Figure 2:
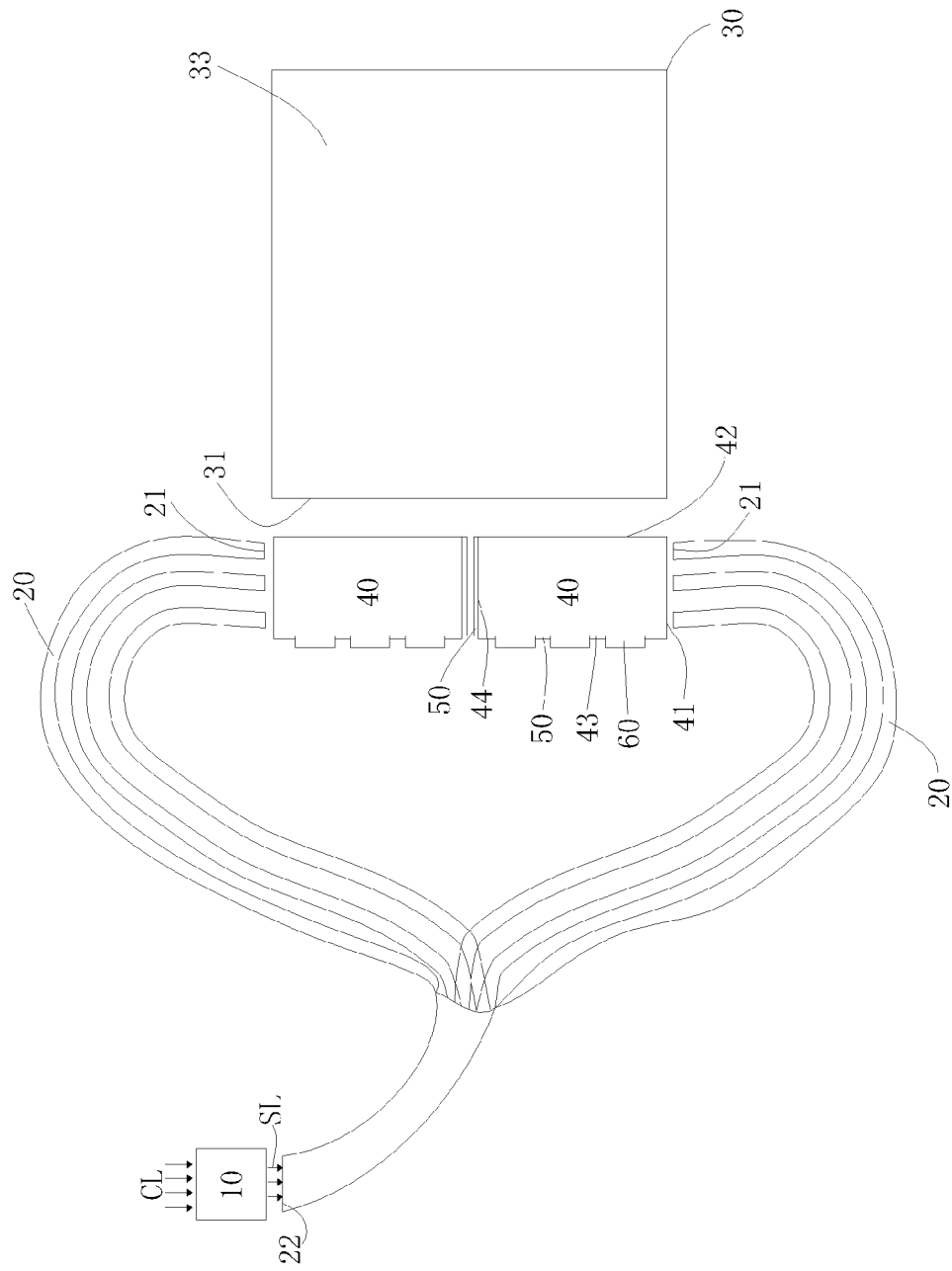
FIG. 2 is a schematic view of the light guiding system in accordance with one embodiment.
Figure 3:
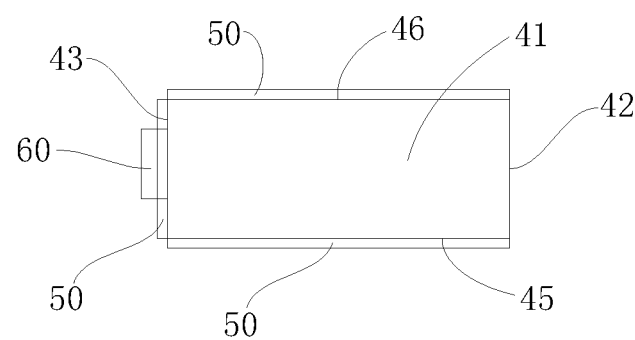
FIG. 3 is a front view of a light incident surface of a light guiding bar in accordance with one embodiment.

Referring to FIGS. 2 and 3, the light guiding system 1 includes an ambient light collection system 10, a plurality of optical fibers 20, and two light guiding bars 40. Specifically, the ambient light collection system 10 faces toward the ambient light CL and absorbs the ambient light CL, and then the ambient light CL are transformed to the absorbed light SL. It is to be noted that the ambient light CL may be lights from sun, lamps, or other lighting objects. The wavelength of the absorbed light SL is within the scope of visible light wavelength. That is, the absorbed light SL may be the backlight source of the backlight module. Each of the optical fibers 20 includes a light emitting end 21 and a light incident end 22. The light incident ends 22 of the optical fibers 20 are coupled together and are arranged close to the ambient light collection system 10. The light guiding plate 30 includes a light incident surface 31 and a light emitting surface 33. The lights entered from the light incident surface 31 are uniformly mixed within the light guiding plate 30 and then emit out by the light emitting surface 33. The light guiding bar 40 includes a light emitting surface 42, a light incident surface 41 connected to the light emitting surface 42, and a first lateral side 44. The light emitting surfaces 42 of the light guiding bars 40 face toward the light incident surface 31 of the light guiding plate 30 and are close to the light incident surface 31 of the light guiding plate 30. The first lateral sides 44 of the two light guiding bars 40 face toward each other. In addition, the light guiding bar 40 may be made by material such as PMMA (Polymethylmethacrylate).

In the embodiment, the optical fibers 20 may be divided into a first optical fiber and a second optical fiber group. The light emitting ends 21 of the first optical fiber group are arranged close to the light incident surface 41 of the first light guiding bar 40. The light emitting ends 21 of the second optical fiber group are arranged close to the light incident surfaces 41 of the first light guiding bar 40. It is to be noted that the number of the optical fibers in the first optical fiber group is preferably the same with that of the second optical fiber group so as to equalize the light emitted from the light emitting surface 42 of each of the light guiding bar 40. In addition, the number and the configuration of the light emitting ends 21 may be changed in accordance with real scenario. The absorbed light SL emitted from the ambient light collection system 10 enters the optical fibers 20 by the light incident end 22 and then propagates toward the light emitting ends 21. The optical fibers 20 are good light transmission devices as the energy loss is quite low. After entering the light guiding bar 40, the lights are mixed and then emit out via the light emitting surface 42.

The light guiding bar 40 further includes a second lateral side 43 opposite to the light emitting surface 42, and a bottom 45 and a top 46 connected to the light emitting surface 42. In order to maximize the lights emitted from the light emitting surface 42, a reflective layer 50 is arranged on the first lateral side 44, the second lateral side 43, the bottom 45, and the top 46. In this way, the lights radiated on the reflective layer 50 are reflected back to the light guiding bar 40.

The reflective layer 50 may be a metallic reflective layer or a dielectric layer. The metallic layer may be made by materials with high-reflective rate, such as silver, gold, and alumni. The dielectric layer may be made by high-reflective rate materials, such as $TiO_2$, $HfO_2$, and $ZrO_2$, or low-reflective rate materials, such as $SiO_2$ and $Al_2O_3$.

In order to obtain uniformly distributed lights emitted from the light emitting surface 42, a plurality of dots 60 are arranged on the second lateral side 43. The lights emitted from the light incident surface 41 are scattered by the dots 60. Thus, the lights are reflected several times and then emit out by the light emitting surface 42. With an ideal arrangement of the dots 60, the lights emitted from the light emitting surface 42 are uniformly distributed. The lights then enter the light guiding plate 30 via the light incident surface 31. After being mixed, the lights emit out from the light emitting surface 33. In addition, in order to avoid low brightness existing in the gap between the two opposite first lateral side 44 of the light guiding bar 40, the density of the dots 60 arranged on the second lateral side 43 may be increased. Alternatively, the dimension of the dots 60 may be increased. In the embodiment, the dots 60 are, but not limited to, substantially cylinder-shaped.

Figure 4:
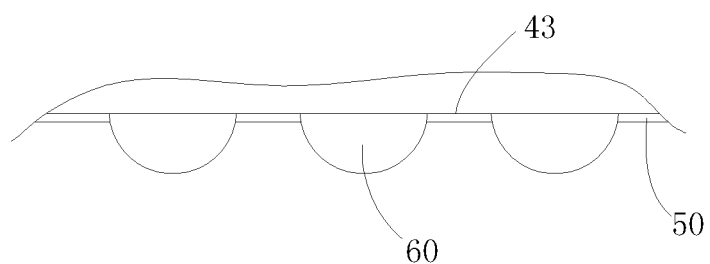
FIG. 4 is a schematic view of the dots on the second lateral side of the light guiding bar in accordance with one embodiment.

Referring to FIG. 4, the dots 60 are hemisphere-shaped. In other embodiments, the shape of the dots 60 may be pyramid or other shapes.

Figure 5:
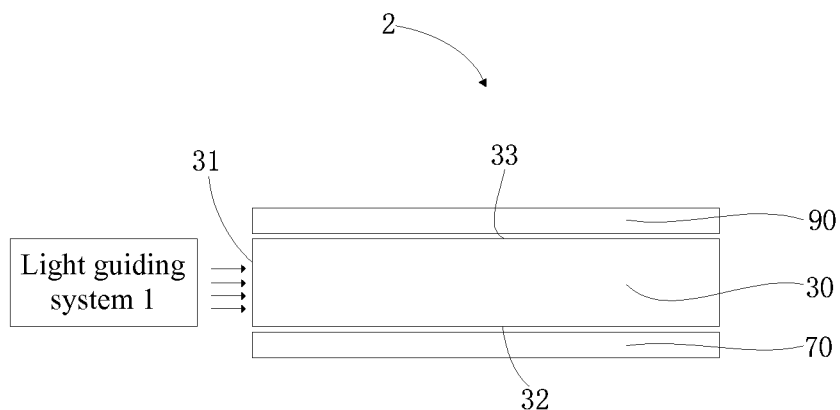
FIG. 5 is a schematic view of the edge type backlight module in accordance with one embodiment.

FIG. 5 is a schematic view of the edge type backlight module in accordance with one embodiment. The edge-type backlight module 2 includes a back plate 70, a light guiding plate 30, an optical film 90, and the light guiding system 1. The light guiding plate 30 includes the light incident surface 31, and the bottom surface 32 and the light emitting surface 33 opposite to each other. The bottom surface 32 and the light emitting surface 33 connect to the light incident surface 31. The back plate 70 is arranged below the bottom surface 32, and the optical film 90 is arranged above the light emitting surface 33. The lights emitted from the light guiding system 1 are mixed within the light guiding plate 30, and then emit out by the light emitting surface 33.

Figure 6:
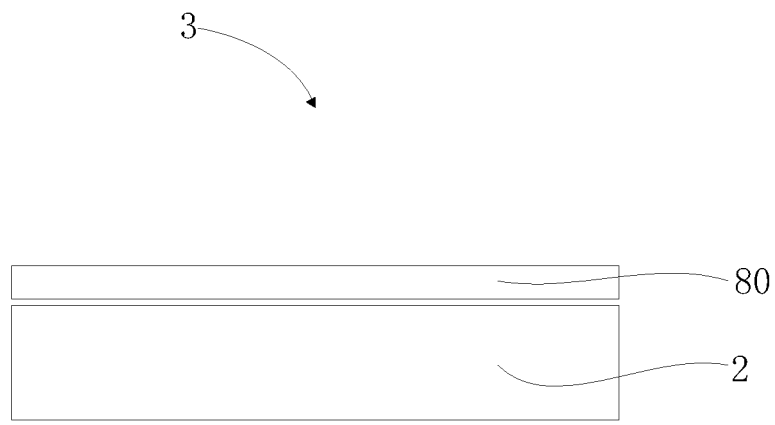
FIG. 6 is a schematic view of the liquid crystal module in accordance with one embodiment.

FIG. 6 is a schematic view of the liquid crystal module in accordance with one embodiment. A display panel 80 is arranged on the edge-type backlight module 2 to form a liquid crystal display 3. The edge-type backlight module 2 supplies lights to the display panel 80 such that the display panel 80 can display images.

In view of the above, by adopting two light guiding bars, the plurality of optical fibers may be divided to two groups. In this way, the width and the length of the light guiding bar 40 are decreased, and thus the dimension and the weight of the edge-type backlight module are decreased. At the same time, the optical path within the light guiding bar is decreased. By configuring the shape and the arrangement of the dots, the lights from the light emitting ends uniformly radiate to the light guiding plate such that the optical performance of the edge-type backlight module is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guiding system for an edge-type backlight module, comprising:
   an ambient light collection system facing toward ambient light to absorb the ambient light and to generate absorbed light;
   a plurality of light guiding devices, each of the light guiding devices comprises a light emitting end and a light incident end, the light incident ends of the optical fibers are arranged close to the ambient light collection system, and the lights entered from the light incident ends are propagated toward the light emitting ends; and
   at least a first and a second light guiding bars, each of the light guiding bars comprises a light emitting surface, a light incident surface connected to the light emitting surface, and a first lateral side opposite to the light incident surface, the light emitting surface is close to a light incident surface of a light guiding plate, the first lateral surfaces of the first and the second light guiding bars face toward each other, the light guiding devices are divided into a first group and a second group, the light emitting ends of the first group are arranged close to the light incident surfaces of the first light guiding bar, and the light emitting ends of the second group are arranged close to the light incident surfaces of the second light guiding bar.

2. The light guiding system as claimed in claim 1, wherein the number of the light guiding devices in the first group is the same with that of the second group.

3. The light guiding system as claimed in claim 1, wherein the light guiding devices are optical fibers, and the light guiding bars are made by PMMA.

4. The light guiding system as claimed in claim 1, wherein the light guiding bar further comprises a second lateral side opposite to the light emitting surface, and a bottom and a top connected to the light emitting surface, and a reflective layer is arranged on the first lateral side, the second lateral side, the bottom, and the top.

5. The light guiding system as claimed in claim 4, wherein a plurality of dots is arranged on the second lateral side, and the dots are substantially cylinder-shaped.

6. The light guiding system as claimed in claim 4, wherein a plurality of dots is arranged on the second lateral side, and the dots are substantially hemisphere-shaped.

7. An edge type backlight module, comprising:
   a back plate, a light guiding plate and an optical film, the light guiding plate comprises a light incident surface, a bottom surface and a light emitting surface opposite to each other, the bottom surface and the light emitting surface connect to the light incident surface, the back plate is arranged below the bottom surface, and the optical film is arranged above the light emitting surface; and
   a light guiding system comprises:
   an ambient light collection system facing toward ambient light to absorb the ambient light and to generate absorbed light;
   a plurality of light guiding devices, each of the light guiding devices comprises a light emitting end and a light incident end, the light incident ends of the optical fibers are arranged close to the ambient light collection system, and the lights entered from the light incident ends are propagated toward the light emitting ends; and
   at least a first and a second light guiding bars, each of the light guiding bars comprises a light emitting surface, a light incident surface connected to the light emitting surface, and a first lateral side opposite to the light incident surface, the light emitting surface is close to a light incident surface of a light guiding plate, the first lateral surfaces of the first and the second light guiding bars face toward each other, the light guiding devices are divided into a first group and a second group, the light emitting ends of the first group are arranged close to the light incident surfaces of the first light guiding bar, and the light emitting ends of the second group are arranged close to the light incident surfaces of the second light guiding bar.

8. The edge type backlight module as claimed in claim 7, wherein the number of the light guiding devices in the first group is the same with that of the second group.

9. The edge type backlight module as claimed in claim 7, wherein the light guiding devices are optical fibers, and the light guiding bars are made by PMMA.

10. The edge type backlight module as claimed in claim 7, wherein the light guiding bar further comprises a second lateral side opposite to the light emitting surface, and a bottom and a top connected to the light emitting surface, and a reflective layer is arranged on the first lateral side, the second lateral side, the bottom, and the top.

11. The edge type backlight module as claimed in claim 10, wherein a plurality of dots is arranged on the second lateral side, and the dots are substantially cylinder-shaped.

12. The edge type backlight module as claimed in claim 10, wherein a plurality of dots is arranged on the second lateral side, and the dots are substantially hemisphere-shaped.

13. A liquid crystal display, comprising:
    a back plate, a light guiding plate, an optical film, and a display panel, the light guiding plate comprises a light incident surface, a bottom surface and a light emitting surface opposite to each other, the bottom surface and the light emitting surface connect to the light incident surface, the back plate is arranged below the bottom surface, and the optical film is arranged above the light emitting surface; and
    a light guiding system comprises:
        an ambient light collection system facing toward ambient light to absorb the ambient light and to generate absorbed light;
        a plurality of light guiding devices, each of the light guiding devices comprises a light emitting end and a light incident end, the light incident ends of the optical fibers are arranged close to the ambient light collection system, and the lights entered from the light incident ends are propagated toward the light emitting ends; and
        at least a first and a second light guiding bars, each of the light guiding bars comprises a light emitting surface, a light incident surface connected to the light emitting surface, and a first lateral side opposite to the light incident surface, the light emitting surface is close to a light incident surface of a light guiding plate, the first lateral surfaces of the first and the second light guiding bars face toward each other, the light guiding devices are divided into a first group and a second group, the light emitting ends of the first group are arranged close to the light incident surfaces of the first light guiding bar, and the light emitting ends of the second group are arranged close to the light incident surfaces of the second light guiding bar.

14. The liquid crystal display as claimed in claim 13, wherein the number of the light guiding devices in the first group is the same with that of the second group.

15. The liquid crystal display as claimed in claim 13, wherein the light guiding devices are optical fibers, and the light guiding bars are made by PMMA.

16. The liquid crystal display as claimed in claim 13, wherein the light guiding bar further comprises a second lateral side opposite to the light emitting surface, and a bottom and a top connected to the light emitting surface, and a reflective layer is arranged on the first lateral side, the second lateral side, the bottom, and the top.

17. The liquid crystal display as claimed in claim 16, wherein a plurality of dots is arranged on the second lateral side, and the dots are substantially cylinder-shaped.

18. The liquid crystal display as claimed in claim 16, wherein a plurality of dots is arranged on the second lateral side, and the dots are substantially hemisphere-shaped.

\* \* \* \* \*